Figure 1:
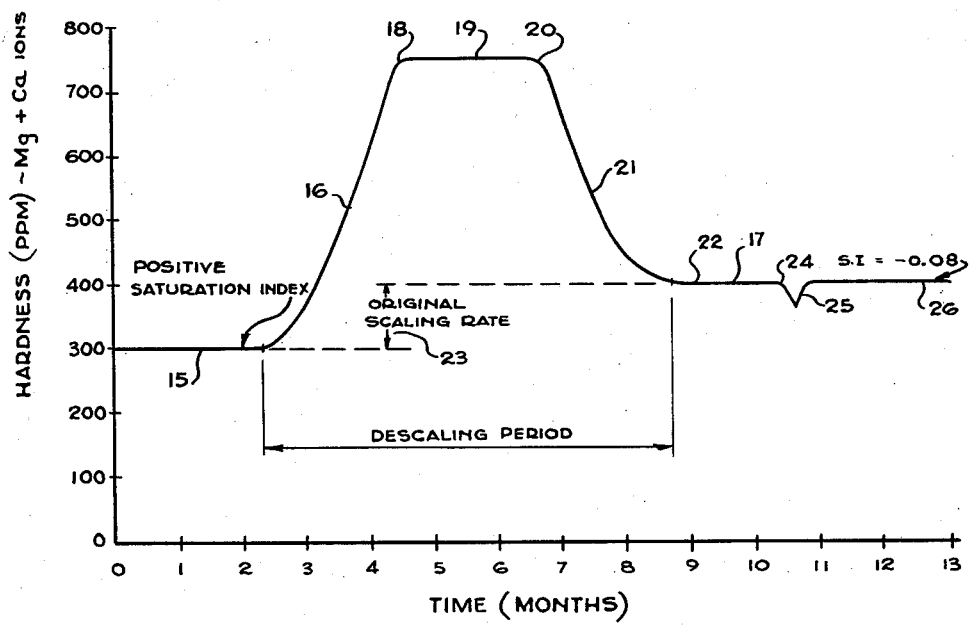

April 21, 1964     H. F. KELLER, JR     3,130,153
TREATMENT OF WATER TO PREVENT SCALING OR CORROSION
Filed May 13, 1959

HOWARD F. KELLER, JR.
INVENTOR.

BY *William P. Green*
ATTORNEY

United States Patent Office

3,130,153
Patented Apr. 21, 1964

3,130,153
TREATMENT OF WATER TO PREVENT SCALING OR CORROSION
Howard F. Keller, Jr., 1364 Riverside Drive, Fullerton, Calif.
Filed May 13, 1959, Ser. No. 812,885
14 Claims. (Cl. 210—58)

This invention relates to an improved method of treating water, or a fluid mixture containing water, for the purpose of preventing the formation of scale within pipes or equipment through which the water is passed. The method is in certain respects especially useful for treating the production fluid of an oil well, where that fluid contains an appreciable amount of water of a character tending to normally form scale in the production lines.

In the past, numerous different processes have been proposed for treating water to prevent scaling. However, all of these prior methods with which I am acquainted have had certain very decided disadvantages when applied to scaling situations of the general type encountered in oil wells. For example, many of these prior expedients have proven far too expensive for regular use in treating large quantities of water, by reason of the correspondingly large quantities of treating chemicals which are required. Other proposed methods have either been relatively ineffective to actually control scaling, or though effective for that purpose have tended instead to induce corrosion in the equipment, or have produced one or more other adverse effects.

The general object of the present invention is to provide an improved method for preventing scaling in a manner overcoming these various disadvantages of prior systems. The present treatment acts in an extremely simple and inexpensive way to create a condition of substantial equilibrium in the water, which condition functions to inherently retain the hardening agents in solution in the water, to thus prevent the precipitation of these materials, onto the walls of the equipment which contains the water. A particular advantage of the present process resides in the fact that it utilizes a minimum quantity of treating chemical for attaining the desired state of substantial equilibrium. It is by reason of this fact that the cost of the treatment is kept much lower than in prior processes. In addition to this advantage, the present method is designed to very positively and reliably maintain the water in a condition in which it is neither scaling in tendency nor corrosive, to thus protect the equipment against either of these two types of adverse effects.

In well production fluids, and most other fluids containing normally scaling water, the primary scaling substance in the water is calcium carbonate ($CaCO_3$), which is produced from calcium bicarbonate [$Ca(HCO_3)_2$] by the following reversible reaction:

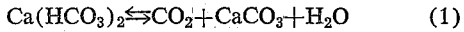
$$Ca(HCO_3)_2 \rightleftharpoons CO_2 + CaCO_3 + H_2O \quad (1)$$

When an excess of calcium carbonate is present in the water, over and above that required to maintain equilibrium with the carbon dioxide, then the calcium carbonate precipitates out and forms scale on the walls of the equipment within which the water is contained. One previously proposed method for preventing such deposition of calcium carbonate has called for the addition of certain types of relatively strong acids to the water, in sufficient quantity to counteract the scaling tendency of the calcium carbonate. For example, such acids as hydrochloric acid, sulphuric acid, acetic acid, formic acid and proprionic acid have been suggested for this purpose. When such acids are employed as the treating chemical, they function first to displace the carbon dioxide from solution in the above reversible reaction, and then to accumulate in the water in a sufficient quantity to counteract the calcium carbonate and thereby prevent its deposition as scale. However, a major disadvantage of this method has been the inherent necessity for the use of relatively large quantities of the treating acid, since enough acid must be added to by itself completely overcome all of the carbonate present, thereby resulting in an excessive overall cost of treatment.

The treating method of the present invention is somewhat similar to the above discussed acid treatment method, but has been especially developed to attain the desired non-scaling condition with the use of a considerably reduced amount of treating chemical, and therefore at a greatly reduced cost. The method of this invention utilizes as the scale preventing chemical an acid or combination of acids which are purposely selected to be considerably weaker than those heretofore employed. More particularly, the acids which I utilize are weak enough (have low enough ionization constants) that they will not displace carbon dioxide from solution. Consequently, when these acids are added to water containing the materials of Reaction 1 above, the treating acid and the carbon dioxide are both retained in solution, so that their effects are additive in counteracting, and preventing deposition of, the calcium carbonate which is present. Since the dissolved carbon dioxide which was already present in the water (as carbonic acid) is thus employed as one of the major acidic constituents in the ultimate solution, the treating acid can be present in relatively small amounts, just sufficient in quantity to create a condition of non-scaling equilibrium when the effect of this acid is added to that of the dissolved carbon dioxide.

In order to achieve this result, I preferably utilize as the treating chemical a water soluble organic acid, or mixture of such acids, which desirably have ionization constants no higher than about $-3.5$ (that is, no closer to a positive value than $-3.5$). For optimum results, these acids are desirably selected from the group of acids consisting of glycolic acid, diglycolic acid, citric acid and tartaric acid. All of these materials have low acid ionization constants, and can be added to water containing calcium bicarbonate, dissolved carbon dioxide, and calcium carbonate without displacing the carbon dioxide from solution. For many well treating uses, I have found it most practical to employ a mixture of glycolic and diglycolic acids, typically twenty percent of the former and eighty percent of the latter by weight, and with these two acids being in aqueous solution (say a twenty-five percent solution by weight), before being added to the water to be treated. When such a mixture is employed, the diglycolic acid actually converts to glycolic acid in use.

Hard water of the type treated by the present invention, besides containing the calcium compounds discussed above, also contain substantial quantities of analogous magnesium compounds, as defined by the following reaction:

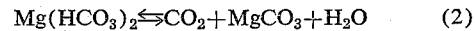
$$Mg(HCO_3)_2 \rightleftharpoons CO_2 + MgCO_3 + H_2O \quad (2)$$

As will be understood, the compounds of this reaction will be affected by the acids utilized in the present process in exactly the same manner as are the compounds of Reaction 1 above. More particularly, the weak treating acids used in the process do not displace the carbon dioxide from solution, but instead leave it in solution and supplement it, to attain a state of substantial equilibrium with the use of a minimum of treating acid.

A factor of considerable importance in controlling the treatment of a particular sample of water in accordance with the present invention is the "Saturation Index" (S.I.) of the water with respect to its contained $CaCO_3$ and $MgCO_3$. As is well known, this Saturation Index (sometimes referred to as "Stability Index") can be obtained by the following formula:

$$(S.I.) = pH\ (initial) - pH\ (saturated)$$

where pH (initial) is the initial pH of the aqueous solution being tested, and pH (saturated) is the pH of the same solution after $CaCO_3$ and $MgCO_3$ have been added to saturation.

In the waters which are treated by this invention, it is assumed that the Saturation Index is initially positive, indicating that an excess of calcium and magnesium carbonates are present over and above the amount required to balance the carbon dioxide which is present, and the water therefore has a scaling tendency. The treating acid is added in an amount sufficient to approximately overcome that initial positive Saturation Index, and to ultimately maintain the index at a value close to zero, representing a condition of substantial equilibrium. In this ultimate condition of substantial equilbrium, care is taken not to add enough treating acid to give the Saturation Index a value which is more negative than about $-0.10$, to thereby prevent corrosion such as would result from a more negative S.I. The Saturation Index in the ultimate condition of equilibrium should be between about $+.10$ and $-.10$. A slightly negative index is considered optimum, desirably between about $-.05$ and $-.10$, to definitely assure against any possibility of scaling while at the same time preventing the development of a sufficiently negative index to produce corrosion.

In treating a well by the present method, the treating acid, preferably slowly and essentially continuously, may be added to the production fluid by simply dropping the acid into the well within the annulus formed at the outside of the production string. The acid then falls downwardly to the production zone, to mix with the production fluid and flow upwardly with it through the production tubing to the surface of the earth. Hardness tests and Saturation Index readings may be taken at regular and frequent intervals during the entire treating process, with the water samples for these tests typically being taken from the well fluid at the surface of the earth as the fluid leaves the well.

To facilitate a thorough understanding of certain more specific features of the invention, reference is now made to the accompanying drawing, in which the single figure, designated FIG. 1, is a graph representing the changes in water hardness which occur during the conduct of an oil well treating method in accordance with the invention. In this graph, the hardness of the water is plotted against time, during a rather extended period of treatment of the well. The hardness is given in terms of parts per million of calcium and magnesium ions which are present in the water. The time is designated in months, with the treatment period in the illustrated situation being approximately one year (up to the point at which the ultimate condition of equilibrium is attained). This period can however be greatly reduced by increasing the amount of chemical which is utilized during the descaling period.

The initial portion 15 of the curve represents the hardness of the water leaving the well prior to any treatment. In the particular graph illustrated, this initial hardness is three hundred parts per million (calcium and magnesium ions). It is assumed that in this initial condition the Saturation Index is a fairly high positive value, say for example $+0.25$, meaning that the well fluid has a decided scaling tendency, and has undoubtedly already formed a substantial amount of scale in the well production lines and equipment.

During the second month of the period represented in the graph, treatment was started with a weak acid of the type previously discussed (typically a twenty-five percent solution of glycolic and diglycolic acids—twenty percent glycolic–eighty percent diglycolic). The initial rate of addition of this acid may be relatively high, say about five quarts per day, in order that the scale which is already present in the well can be removed. Shortly after the acid treatment is commenced (for example about 2 or 3 days afterward) the operator at the surface of the earth will notice a substantial increase in the hardness of the water leaving the well. This increase is indicated by the rather abrupt rise at 16 in the curve shown in the drawing. The increase in hardness represented by this portion of the curve shows that some of the accumulated scale (calcium carbonate and magnesium carbonate) within the production string and other equipment is being removed and placed back in solution in the fluid.

After the five quart per day treatment has been continued for some time, say about two months, the hardness curve reaches a point 18 at which it commences to flatten out, to form a plateau 19. At the end of this plateau, the curve turns downward at 20, with the hardness in the outlet water then decreasing for a substantial period of time as represented at 21. When all of the scale has finally been removed from the interior of the production string and other equipment, the curve flattens out again as indicated at 22, at a level considerably below plateau 19, but considerably above the initial hardness level 15. As will be understood, the vertical distance 23 between this ultimate level 22 and the initial hardness level 15 then represents the original scaling rate of the well.

After the constant hardness level 22 has been maintained long enough to indicate definitely that the initial scale in the well has all been removed (say when the curve reaches point 17), then the operator commences a slow reduction in the amount of acid which is being added. This reduction is preferably effected as a series of small discrete steps, that is, the amount of acid is first reduced a predetermined small amount (say for example from five quarts per day to four and one-half quarts), then that reduced amount is continued for several days, then the amount is again reduced to a still smaller amount, which is continued for several days, etc.

Assuming that the amount of additive utilized up to the point 17 (five quarts per day in our example) has actually been considerably in excess of the amount ultimately required as a permanent treatment for preventing further scaling, then the first small reduction in the amount of additive, beyond point 17, will probably not cause any drop in the level of the FIG. 1 hardness curve. If this is actually the case, the operator then continues with further intermittent small reductions in the amount of additive until a point 24 is reached at which the reduction in additive then made does in fact cause the hardness curve to turn downwardly. For example this downturn in the curve may typically occur when the operator reduces the amount of additive from three quarts per day to two and one-half quarts per day. The delay periods which are allowed between the different reductions in the amount of additive are provided in order to make certain that the well has ample time in which to respond to the change, and to cause a downturn in the curve.

When the point 24 is reached at which the hardness curve does eventually turn downwardly, this reduction in hardness is a signal to the operator that the amount of additive has now been reduced slightly below the optimum permanent treatment value. Consequently, the operator immediately returns to the amount of additive which had been utilized just prior to the drop in the curve, thereby causing the curve to again turn upwardly at 25, and return to a constant hardness condition as represented at 26, with this final portion 26 of the curve being at the same hardness level as was maintained during the prior portion 22 of the curve. If a cut in the amount of the additive acid from three quarts per day to two and one-half quarts per day produced the drop in the curve at 24, then the operator returns to the three quart per day value, and continues adding three quarts per day permanently as an optimum treatment to prevent scaling.

With this amount of chemical being added, the Saturation Index of the water will almost invariably prove to be between +.10 and −.10, and is usually within the ideal range of between −.05 and −.10. After the portion 26 of the curve has been attained by the above discussed hardness testing method, the operator should actually test the Saturation Index directly, to make certain that it does in fact fall within the desired range. In most instances, this test has indicated an ultimate Saturation Index of about −.08, which is considered the optimum value for most wells.

If the ultimate Saturation Index is controlled in the above discussed manner, so that it is never more negative than −0.10, this control of the Saturation Index will by itself serve in most instances to effectively prevent corrosion. However, in some very difficult wells, it may be desirable to somewhat enhance this effect by adding a corrosion inhibitor to the acid. This inhibitor may for example be any of the amines, which may be added in whatever proportion appears desirable under the particular circumstances encountered.

To make certain that the present disclosure is sufficiently complete and adequate for patent purposes, the following examples of specific well treating processes embodying the invention are given:

*Example 1*

The water produced by this well initially had a hardness (Ca and Mg ions) of 456 parts per million, and had a Saturation Index of +.15. During the descaling period, the well was treated with a mixture of glycolic and diglycolic acids of the type discussed above (twenty-five percent solution, twenty percent glycolic–eighty percent diglycolic). This mixture was added slowly and continuously at the rate of three quarts per day for approximately two months, during which time the hardness curve rose to a peak of approximately 650 parts per million, and then fell to a value between 500 and 600 parts per million. The amount of treating chemical was then gradually reduced, ultimately to one and one-half quarts per day, at which time it produced a drop in the hardness to approximately 460 parts per million. The amount of chemical was then raised back to one and three-fourths quarts per day, and was maintained at that value as a permanent treatment to prevent further scaling. All scale had been removed from the well, and the continued treatment did in fact prevent additional scaling, and in addition did not induce corrosion. The ultimate hardness of the water discharged from the well, after treatment, was 529 parts per million, with the Saturation Index being −0.08.

*Example 2*

In this example, the same mixture of chemicals was used, and the same general method of treatment was employed, with the initial hardness of the water being 404 parts per million, the peak hardness at the highest point of the curve being 784 parts per million, and the final hardness value being 520 parts per million. The ultimate Saturation Index was −0.02, the intial index +.3. During the descaling operation in this well, the chemical was added at the rate of two quarts per day, and was reduced to a minimum of three-fourths quart per day before being returned to one quart per day as a final preventive treatment.

*Example 3*

In this example the treating chemical was a twenty-five percent solution of mixed glycolic and citric acids, twenty percent glycolic and eighty percent citric. The same general method of treatment was used as indicated above. The initial Saturation Index was +0.25 with a hardness of 480 p.p.m. The well was treated with three quarts per day of the solution, during the descaling period, and the peak of the curve was reached at 750 p.p.m. The final hardness was 560 p.p.m. at an ultimate treating rate of one and one-half quarts per day, and with a final index of −0.08.

*Example 4*

Same general treatment method. Treating chemical, twenty-five percent solution of tartaric acid; initial Saturation Index +.25; ultimate index −0.07; treatment rate three and one-half quarts per day during descaling; two quarts per day permanent treatment; initial hardness 500 p.p.m., peak hardness 800 p.p.m., and final hardness 570 p.p.m.

I claim:

1. The method of treating water which contains dissolved carbon dioxide and an excess of scaling carbonates and has a positive Saturation Index; said method comprising adding to the water organic acid which is water soluble but is too weak to displace the carbon dioxide from solution, maintaining the acid and carbon dioxide in solution together so that their anti-scaling effects are additive, continuing to add said weak organic acid to the water, and regulating the proportion of said acid which is added until an ultimate condition of substantial equilibrium is reached in which the acid and carbon dioxide substantially counteract the carbonates and thereby prevent scaling, and in which said Saturation Index is slightly negative, but no more negative than about −0.10, to thereby also prevent corrosion.

2. The method as recited in claim 1, in which said Saturation Index in said ultimate condition of substantial equilibrium is between about −0.05 and −0.10.

3. The method as recited in claim 1, in which said organic acid has an acid ionization constant not higher than about −3.5.

4. The method as recited in claim 1, in which said water is contained in an initially scaled system, said method including first adding said acid in a relatively large proportion and thereby removing said initial scale, and then reducing the proportion of the acid to an amount attaining said ultimate condition of substantial equilibrium.

5. The method as recited in claim 1, in which said water is contained in an initially scaled system, said method including first adding said acid in a relatively large proportion and thereby removing said initial scale, then gradually reducing said proportion of the added acid after removal of the initial scale and until a reduction in the hardness of the water is noted, and then slightly increasing the proportion of the acid to an amount just great enough to prevent said reduction in hardness and to thereby maintain said ultimate condition of substantial equilibrium.

6. The method as recited in claim 1, in which said water is contained in an initially scaled system, said method including first adding said acid in a relatively large proportion and thereby removing said initial scale, testing the hardness of the water at intervals to determine the effect of said added acid, continuing the addition of said relatively large proportion of the acid until the hardness of the water has attained a maximum value and has then decreased to a lower but essentially constant value indicating completion of the scale removal process, and then reducing the proportion of the acid to an amount attaining said ultimate condition of substantial equilibrium.

7. The method as recited in claim 1, in which said water is contained in an initially scaled system, said method including first adding said acid in a relatively large proportion and thereby removing said initial scale, testing the hardness of the water at intervals to determine the effect of said added acid, continuing the addition of said relatively large proportion of the acid until the hardness of the water has attained a maximum value and has then decreased to a lower but essentially constant value indicating completion of the scale removal process, then gradually reducing said proportion of the added acid after removal of the initial scale and until a reduction in the hardness of the water is noted, and then slightly increasing the proportion of the acid to an amount just great enough to prevent said reduction in hardness and to thereby maintain said ultimate condition of substantial equilibrium.

8. The method of treating water which contains dissolved carbon dioxide and an excess of scaling carbonates and has a positive Saturation Index; said method comprising adding to the water organic acid which is water soluble but is too weak to displace the carbon dioxide from solution and which is selected from the group consisting of glycolic acid, diglycolic acid, citric acid and tartaric acid, maintaining the acid and carbon dioxide in solution together so that their anti-scaling effects are additive, continuing to add said weak organic acid to the water, and regulating the proportion of said acid which is added until an ultimate condition of substantial equilibrium is reached in which the acid and carbon dioxide substantially counteract the carbonates and thereby prevent scaling, and in which said Saturation Index is slightly negative, but no more negative than about $-0.10$, to thereby also prevent corrosion.

9. The method as recited in claim 8, in which said added acid is a mixture of glycolic acid and diglycolic acid.

10. The method of treating a well production fluid which contains water having carbon dioxide and an excess of scaling carbonates therein and having a positive Saturation Index; said method comprising adding to said production fluid at the production zone organic acid which is water soluble but is too weak to displace the carbon dioxide from solution, maintaining the acid and carbon dioxide in solution together so that their anti-scaling effects are additive as the water flows upwardly through the well, continuing to add said weak organic acid to the water, and regulating the proportion of said acid which is added until an ultimate condition of substantial equilibrium is reached in which the acid and carbon dioxide substantially counteract the carbonates and thereby prevent scaling, and in which said Saturation Index is slightly negative, but no more negative than about $-0.10$, to thereby also prevent corrosion.

11. The method as recited in claim 10, in which said organic acid is selected from the group consisting of glycolic acid, diglycolic acid, citric acid and tartaric acid.

12. The method of treating the production fluid in an initially scaled well, said fluid containing water having carbon dioxide and an excess of scaling carbonates therein and having a positive Saturation Index; said method comprising adding to said production fluid at the production zone acid selected from the group consisting of glycolic acid, diglycolic acid, citric acid and tartaric acid, maintaining the acid and carbon dioxide in solution together so that their anti-scaling effects are additive as the water flows upwardly through the well, removing said accumulated scale from the well by the combined effects of said added acid and carbon dioxide, adding said acid during the scale removal period in a relatively large proportion, and then reducing the proportion of added acid after said scale removal period to an amount thereafter maintaining a condition of substantial equilibrium in which the acid and carbon dioxide substantially counteract the carbonates and thereby prevent scaling, and in which said Saturation Index is slightly negative, but no more negative than about $-0.10$, to thereby also prevent corrosion.

13. The method as recited in claim 12, in which said ultimate Saturation Index is maintained between about $-0.05$ and $-0.10$.

14. The method as recited in claim 12, including testing the hardness of the water at intervals to determine the effect of said added acid, continuing the addition of said relatively large proportion of the acid until the hardness of the water has attained a maximum value and has then decreased to a lower but essentially constant value indicating completion of the scale removal process, then gradually reducing said proportion of the added acid after removal of the initial scale and until a reduction in the hardness of the water is noted, and then slightly increasing the proportion of acid to an amount just great enough to prevent said reduction in hardness and to thereby maintain said ultimate condition of substantial equilibrium.

References Cited in the file of this patent

UNITED STATES PATENTS

| | | |
|---|---|---|
| 865,700 | Hernsheim et al. | Sept. 10, 1907 |
| 1,405,783 | Holle | Feb. 7, 1922 |
| 2,163,436 | Raymond et al. | June 30, 1939 |
| 2,221,353 | Lamerick et al. | Nov. 12, 1940 |
| 2,230,001 | McConnell et al. | Jan. 28, 1941 |
| 2,238,930 | Chamberlain et al. | Apr. 22, 1941 |
| 2,352,832 | Gunderson | July 4, 1944 |
| 2,429,593 | Case | Oct. 28, 1947 |
| 2,777,818 | Gambill | Jan. 15, 1957 |
| 2,852,077 | Cocks | Sept. 16, 1958 |
| 2,994,664 | Wachter | Aug. 1, 1961 |

OTHER REFERENCES

"Citric Acid's New Role," Pfizer, Chemical Engineering, June 1956, page 146.